United States Patent Office 3,375,602
Patented Apr. 2, 1968

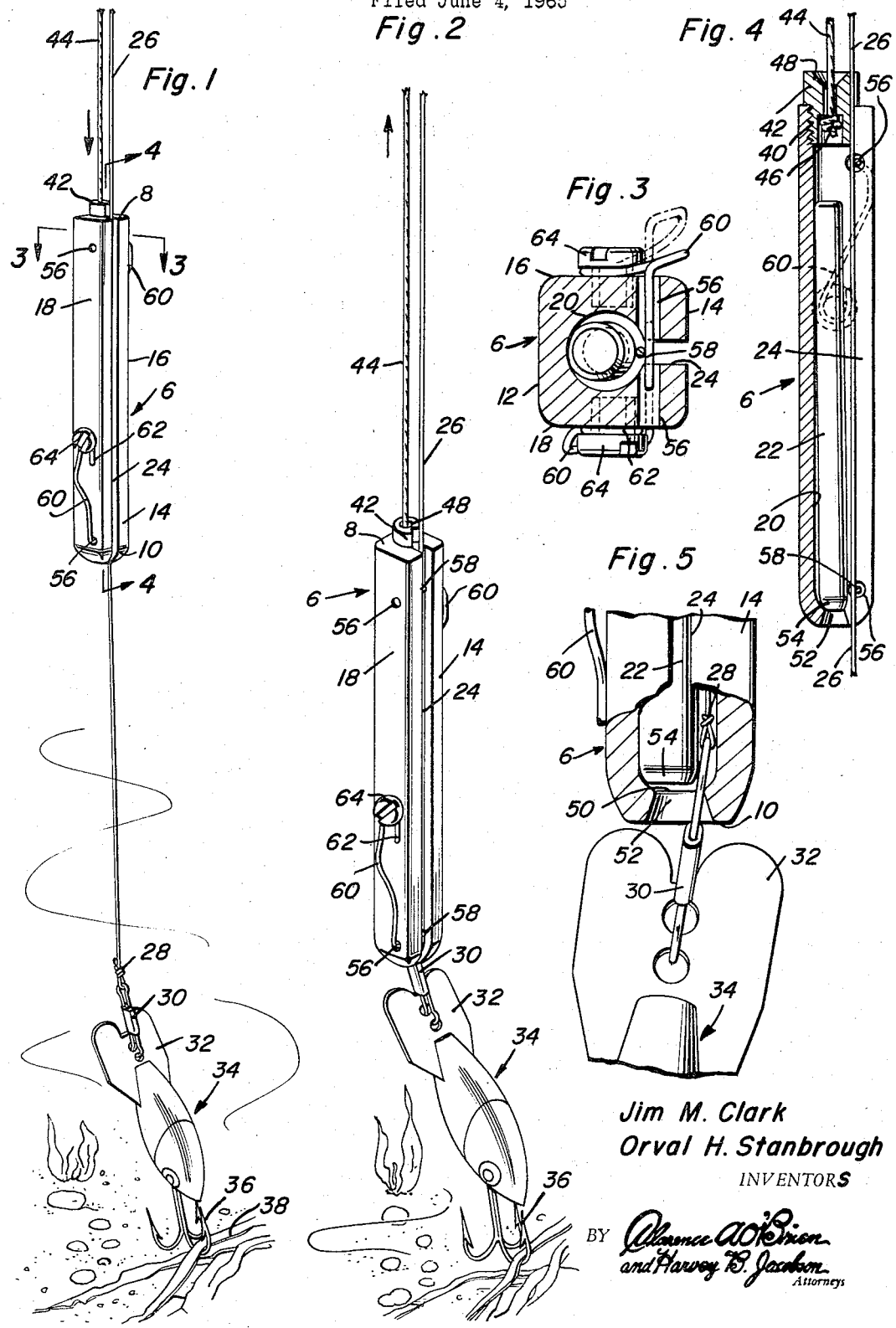

3,375,602
BAIT OR LURE RETRIEVING DEVICE
Jim M. Clark, 101 E. Main St., Batesville, Ark. 72501,
and Orval H. Stanbrough, Marcella, Ark. 72360
Filed June 4, 1965, Ser. No. 461,343
3 Claims. (Cl. 43—17.2)

ABSTRACT OF THE DISCLOSURE

The above invention pertains to a releasing device for gripping a snagged lure. It is characterized by a hollow elongated weight whose hollow portion provides (1) an open ended passage for the fishing line and (2) a chamber for a confined plunger. This plunger is free to move reciprocably in the chamber. The lower end of the chamber is reduced to provide a stop shoulder or seat. The cooperable lower end of the plunger is chamfered and thus adapted to clampingly bind the lure, or a part thereof, between itself and said stop shoulder in a manner to retrieve the line and lure.

---

The present invention relates to a device which can be readily attached by hand to a fishing line and which, with the aid of a lifting and lowering line, will gravitate down the fishing line and abut and come into engagement with an artificial bait or lure which has become snagged on a rock or other underwater object and which is such in construction that it will free the bait or lure and permit it and the fishing line to be retrieved.

Lure and fishhook freeing and retrieving devices are old and well known and, under the circumstances it can be stated that the device comprehended in the preceding introductory statement of the invention is common to the art. An object of the instant invention is to provide the user with a retriever which features structurally and functionally distinct parts which cooperate in a novel and unique manner whereby to provide the user with an adaptation which is aptly capable of serving the purposes for which it is intended.

In carrying out the present invention a gravity lowerable weight is provided. This weight is of hollow elongated form and the hollow portion provides an open-ended passage for the tautly held fishing line. This weight is provided with an open-ended slot which is communicatively registrable with a passage and which opens through a peripheral side or surface and accordingly permits the weight to be lined up with and applied to the fishing line. This slotted slidable body or weight is provided at its upper end with suitable means for attaching a lifting and lowering line and is also provided with yieldable retaining latches which function to maintain the body in its operative position on the line.

The hollow portion of the weight is novel in that it not only provides a passage for the fishing line but is straight and amply long and large that it serves to accommodate an elongated secondary internal weight which constitutes a plunger. The forward or lower end of the plunger cooperates with the corresponding or leading end of the weight in such a manner that it jams against and friction-grips the link or clasp-type fastener on the trailing end of the lure to achieve a clamping action which friction-locks the retriever to the lure fastener and enables one to work and pull the lure loose from its underwater anchor and thereafter retrieve it by forcibly pulling it loose with the retrieving line.

Then, too, novelty is predicated on having the lower or leading end of the passage in the weighted body restricted to provide a gripping shoulder for the chamfered lower end of the plunger and, in addition, to provide a funnel-like inlet to facilitate piloting the lower or leading end of the weight into cooperating grippable relationship with the link or equivalent component part of the lure which when frictionally gripped brings about the retrieving action desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective showing a snagged plug, lure or other artificial bait and, what is important, showing how the retrieving device is being lowered on the tautened line so that the leading or forward end will strike the target and interrelate the retrieving device and lure for retrieval by the angler;

FIGURE 2 is a view on a slightly enlarged scale showing how the device is lined up with the lure and in fact how it is frictionally coupled thereto to initiate the loosening and retrieving step;

FIGURES 3 and 4 are sectional views taken on the plane of the section lines 3—3 and 4—4, respectively, of FIG. 1; and FIGURE 5 is an enlarged fragmentary sectional and elevational view which serves to show how the beveled or chamfered end of the plunger grippingly binds the fastener on the lure between itself and the retrieving weight or passage to attain the desired clamping result.

Referring now to the views of the drawing the elongated body member or unit comprises an elongated lead, steel or other suitable non-corrodible weight. This weight 6 is preferably rectangular in cross-section and is flat or substantially so at the upper end as at 8, the lower end being rounded and slightly convex as at 10. This weight or body comprises a plurality of flat side surfaces or walls one of which is denoted at 12 (FIG. 3) the opposite wall, the front wall, for example, being denoted at 14. The two opposed side walls are denoted at 16 and 18, being the same in construction. This body is hollow and the hollow portion defines an elongated chamber which can be cylindrical in cross-section, the chamber being denoted at 20 and serving to accommodate an elongated cylindrical secondary weight which is preferably designated as a self-performing line locking plunger 22. The chamber or passage is made accessible by way of a side slot 24 which is of a length equal to the length of the passage and which opens not only through the top and bottom ends but through the periphery of the surface 14 to allow the weight to be applied to the fishing line 26. The fishing line has its lower end portion 28 connected in any suitable manner to a fastener 30 on the trailing end or tail portion 32 of an artificial bait or lure denoted generally at 34. The hook 36 on this lure is shown in its snagged or anchored position on the underwater debris 38. The upper end of the passage is screw-threaded so that the threads serve to accommodate coacting threads on a screw-threaded neck 40 carried by a nut-like member 42 having a hole therethrough for attachment of the lifting and lowering line 44. The lower end of the line is knotted as at 46 and the upper end of the passage through which it passes is provided with a flared recess 48.

The opposite end of the passage is restricted in cross-section as at 50 where it is registrable with a funnel-like or flared opening 52, this being at the convex lower or leading end 10 as shown in FIG. 5. The beveled or chamfered lower end 54 of the plunger cooperates with surface 50 in the manner illustrated in FIG. 5.

The plunger equipped weight 6, in addition to featuring the tying and fastening nut 42 for the lifting and lowering line 44 and the specially formed lower end portions 50 and 52 of the passage, is also provided with fishing line retaining means. This means could be of some other construction than shown but it has been found to be satisfactorily usable as shown. The means is the same at both ends and to accomplish the desired result each end adjacent the slot 24 is provided with aligned keeper holes 56 to accommodate a finger-like keeper or latch finger 58 (see FIG. 3). This finger or latch is at one end of a resilient wire clip 60 having a hook 62 at one end secured in place by a fastening screw 64 on a side 16 or 18 to which it is connectible. It is preferred that the two clips at the opposite ends be alternated so that the user can readily catch hold of the same with the index fingers of the left and right hands and spring the latches or fingers so that they open the end portions of the slot 24. This is to say the fingers are normally spring-biased to bridge the slot and in this position they constitute retainers. When, however, they are unlatched in the manner shown in dotted lines in FIG. 3 it will be clear how easily one can apply the device to the fishing line or vice versa connect the fishing line with the device in readiness for downward sliding toward the target 34.

In operation, it is understood that it is necessary before applying the lure loosening and retrieving device to the fishing line to draw the fishing line so that it will be taut enough to achieve this attaching step. Then, as already mentioned, the latches are sprung to open position with the fingers of the hands, and the device is applied by registering the slot 24 with the line. By releasing the latches the fishing line is now in position, or vice versa, the device is in ready-to-use position on the fishing line. The device is lowered with the assistance of the hoisting or lowering line 44. The fact that the device is chiefly in the form of a relatively heavy weight it will be evident that it will slide down the line toward the target 34. When the nose or leading end 10 thus lines itself up with the target it will be evident that the plunger weight 22 will bind and frictionally grip the fastener 30 between itself and the surface 50 as illustrated in FIG. 5. It is not necessary to bump the lure loose. In fact, the lure, having now been gripped can be pulled loose by sheer force, this being a significant phase of the underlying principle of use and function of the retriever.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A gripping and retrieving device for a fishing lure which has become snagged on a submerged rock, a log, debris or the like comprising: a hollow elongated weight, the hollow portion providing a through open-ended passage for a fishing line, said weight being provided with an open-ended slot communicating with said passage and opening radially through a cooperating longitudinal peripheral surface of said weight and permitting said weight to be lined up with and applied to a fishing line in a manner to slide down the line toward and abut the aforementioned lure, retractable spring clips carried by upper and lower end portions of said weight for holding said weight slidingly but releasably on said fishing line, the upper end of said passage being screw-threaded, a nut-like member having a screw-threaded neck screwed into the screw-threaded portion of said passage and centrally provided with an auxiliary passage lined up with said first-named passage, a flexible lifting and lowering element having a lower end passing through the auxiliary passage and knotted and secured in place by said nut-like member, a weighted plunger freely slidable in said first named passage, the lower end of said passage being restricted and fashioned into a plunger seating stop shoulder, and the lower end of said plunger being beveled and cooperable with said stop shoulder in a manner to clampingly bind the lure, or a part thereof, between said bevelled lower end and said shoulder.

2. A gripping and retrieving device capable of positively gripping a component part of a fishing lure comprising: a hollow elongated weight whose hollow portion provides a through open-ended passage for a fishing line, said passage having a lower end portion reduced in cross-sectional dimension and expressly formed to provide a seating and stop shoulder for a cooperating end of a plunger, said weight having a funnel-like opening at its lower end registering with said passage and also being provided with an open-ended slot communicating with said passage and opening radially through a cooperating peripheral surface of said weight and permitting the slotted portion of the weight to be lined up with and applied to said fishing line in a manner to slide down the line toward and abut the aforementioned component part of said lure, manually controllable means carried by said weight and capable of holding the weight slidingly but releasably on said line, guide means aligned with said fishing line passage and detachably mounted on the upper end portion of said weight, said guide means having a hole providing an auxiliary passage registering with said fishing line passage, a flexible weight lifting and retrieving line having a lower end portion passing through said auxiliary passage and detachably but operatively connected with said guide means, an elongated weighted plunger of a length less than and confined but freely slidable in said passage and shiftable relative to said weight, said plunger being cylindrical and of a cross-sectional dimension significantly less than the cross-sectional dimension of said passage and having a reduced lower end portion capable of lodging itself in said restricted lower end of said line passage in a manner to clampingly engage and positively bind said component part of said lure between a peripheral surface of said plunger and an adjacent cooperating surface portion of said restricted lower end portion of said line passage, whereby to permit the lure to be positively coupled to the weight and to be retrieved but subsequently released intact and without encountering the likelihood of breakage of the fishing line.

3. The structure defined in and according to claim 2, and wherein the first-named manually controlled means carried by said weight comprises readily attachable and detachable spring clips, said clips being accessibly and yieldably mounted on side surfaces of the respective upper and lower end portions of said weight and having laterally directed free end portions constituting projectable and retractable keeper fingers, said keeper fingers being slidingly and releasably passed through keeper holes provided in said weight in a manner to bridge said slot and to confine the fishing line in said passage.

References Cited

UNITED STATES PATENTS

| | | | |
|---|---|---|---|
| 2,627,691 | 2/1953 | Bress | 43—17.2 |
| 2,651,132 | 9/1953 | Lennen | 43—17.2 |
| 2,914,880 | 12/1959 | Bussey | 43—17.2 |
| 2,950,558 | 8/1960 | Karpes | 43—17.2 |
| 2,425,069 | 8/1947 | Metzler | 43—44.88 |

SAMUEL KOREN, *Primary Examiner.*

D. J. LEACH, *Assistant Examiner.*